Patented Sept. 4, 1951

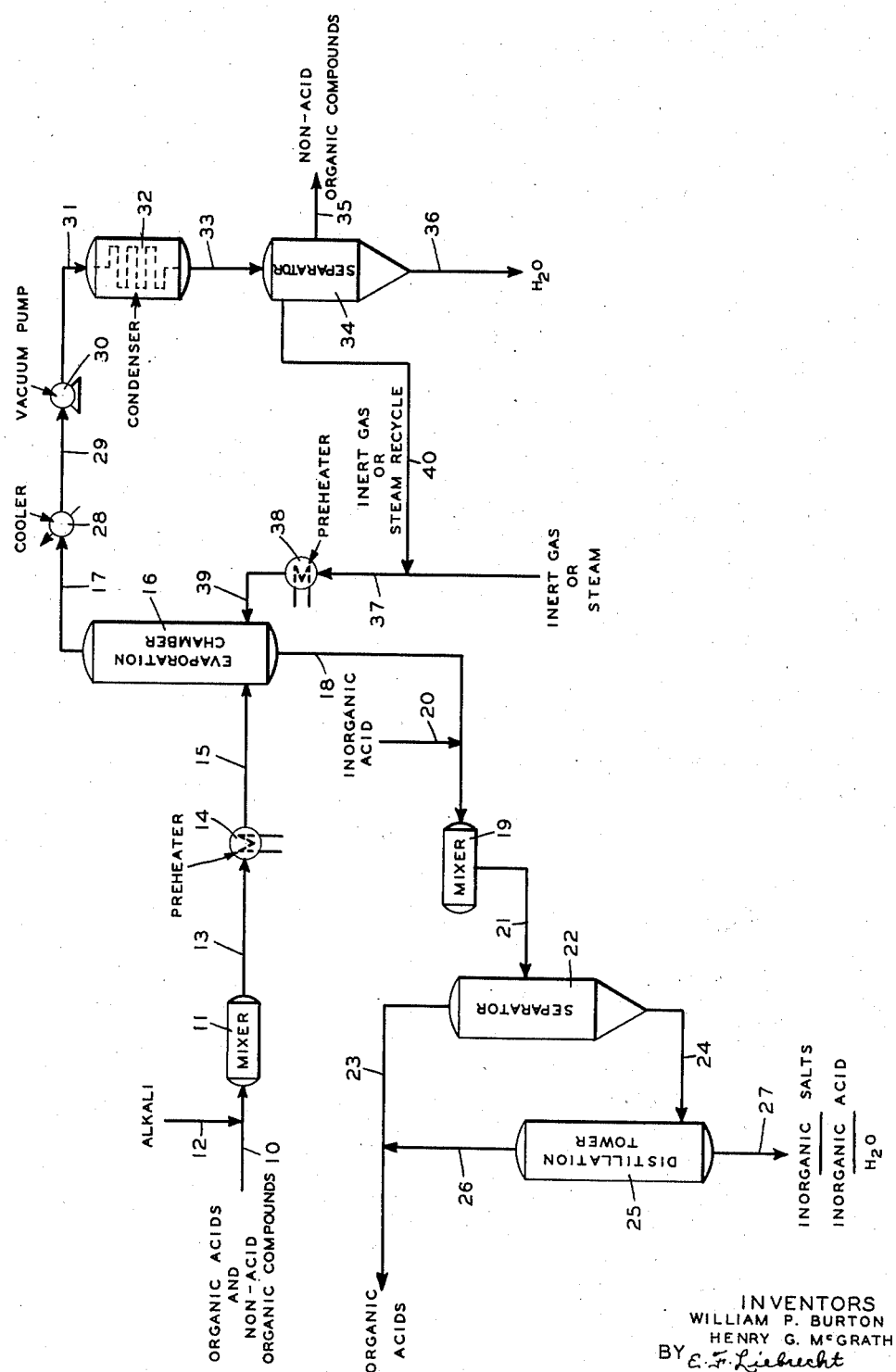

2,566,311

UNITED STATES PATENT OFFICE 2,566,311

SEPARATION OF ORGANIC COMPOUNDS

William P. Burton, Orange, and Henry G. McGrath, Elizabeth, N. J., assignors to The M. W. Kellogg Company, Jersey City, N. J., a corporation of Delaware Application September 26, 1947, Serial No. 776,366

10 Claims. (Cl. 260—450)

This invention relates to the separation of organic compounds and relates more particularly to the separation of organic acids from mixtures thereof with non-acid organic compounds. In one specific aspect, the invention relates to a process for the separation of organic acids from mixtures thereof with non-acid organic compounds present in the reaction product obtained in the catalytic hydrogenation of oxides of carbon at elevated temperatures.

In the catalytic hydrogenation of oxides of carbon at elevated temperatures a reaction product is obtained in the vapor state, as reactor outlet gases, at temperatures varying between about 300° F. and about 700° F. and containing hydrocarbons, water vapor, and oxygenated organic compounds which comprise fatty acids, alcohols, ketones, esters, and aldehydes. These gases may be passed through one or more condensation zones in which they are cooled to temperatures within the range from about 40° F. to about 150° F. The resulting condensate then separates into an aqueous phase and an oil phase. Both phases contain fatty organic acids in admixture with non-acid organic compounds, acids of lower molecular weight tending to remain in the aqueous phase and acids of higher molecular weight tending to remain in the oil or non-aqueous liquid phase.

In treating the aforementioned oil phase by methods outside the scope of the present process, separation of a mixture of oxygenated organic compounds from hydrocarbons may be effected. The mixture of oxygenated organic compounds thus separated comprises fatty organic acids and non-acid oxygenated organic compounds, comprising alcohols, ketones, esters, and aldehydes.

It has been found that separation of organic acids from the aforementioned non-acid organic compounds, becomes increasingly difficult where the respective boiling ranges of the compounds to be separated are in close proximity. This is apparent where separation of fatty organic acids from alcohols, present in the aforementioned oil phase, is attempted, inasmuch as the boiling points of acids and alcohols present do not vary appreciably. In addition esterification may take place as an undesirable result.

It has also been found that these mixtures of organic acids and non-acid organic compounds may be neutralized with alkali to form a phase comprising non-acid organic compounds and a phase comprising alkali salts of the organic acids present in the mixture, followed by subsequent separation of the two phases and the mixture of organic acids regenerated from the salts by the use of a strong mineral acid.

We have found, however, that by reason of the mutual solubility of the components of the aforementioned phases, complete separation of acid and non-acid components cannot be effected. In addition, simple distillation of the non-acid oxygenated organic compounds from the aforementioned alkali salts of the organic acids is not possible, inasmuch as the boiling points of some of the non-acid materials present are too high to permit distillation without decomposition at atmospheric pressure.

We have found that organic acids may be separated from mixtures thereof with at least one non-acid organic compound which may comprise alcohols, ketones, esters, aldehydes, or hydrocarbons individually or in combination, by contacting such mixtures with an alkali or an aqueous solution of an alkali to convert the organic acids to an aqueous solution of the corresponding alkali salts, and that by subjecting the resulting mixture to reduced pressure to evaporate substantially all of the non-acid organic compounds therefrom, the dry salts will be left as a residue. Organic acids may be next regenerated from the aforementioned salts by acidification with an inorganic acid such as sulfuric acid, or hydrochloric acid and subsequently recovered by methods such as distillation or extraction in the manner known to those skilled in the art. The separated non-acid organic compounds may be condensed and similarly subjected to further treatment such as distillation or extraction for the separation of individual components also in the manner known to those skilled in the art.

The aforementioned step of subjecting the mixture comprising a solution of alkali salts of organic acids and non-acid organic compounds to reduced pressure to evaporate non-acid chemicals therefrom, comprises an essential feature of our invention. The aforementioned evaporation step may be carried out at a reduced pressure, below atmospheric pressure, by various methods. One such method embodies evaporation of the non-acid chemicals from the aforementioned mixture, or flashing at a reduced pressure by maintaining a vacuum or partial vacuum on a flash chamber, or evaporation chamber. Heat may be supplied by preheating the feed (comprising the aforementioned mixture of alkali salts of organic acids and non-acid organic compounds) or by supplying additional heat, such as with steam, to the interior of the evaporation or flash chamber.

Another method by which the aforementioned evaporation step may be carried out, embodies the use of additional vapor such as steam, or an inert gas, to reduce the partial pressure of the non-acid organic compounds. This method allows the complete drying out of the alkali salts from the aforementioned solution of alkali salts of organic acids and non-acid organic compounds, without the necessity of maintaining as high a vacuum or any vacuum on the system, depending upon the characteristics of the mixture being recovered. In the first method, the vacuum would be maintained at a higher value than in the second method for the equivalent separation of non-acid organic compounds. In this respect, we have found that in the first method an absolute pressure on the order of approximately 25 mm. of mercury or less is required; whereas in the second method, the pressure may be considerably higher, the value depending upon the quantities of steam or inert gas added. Operating temperatures in the chamber would extend in each case from about 200° F. to about 400° F.

It is therefore an object of this invention to provide an improved method for the separation of organic acids from mixtures thereof with non-acid organic compounds.

Another object of the invention is to provide an improved method for the separation of organic acids from mixtures thereof with non-acid organic compounds present in the reaction product obtained in the catalytic hydrogenation of oxides of carbon at elevated temperatures.

Other objects and advantages inherent in the invention will be apparent from the following more detailed disclosure.

The accompanying drawing illustrates, diagrammatically, one form of the apparatus employed and capable of carrying out one embodiment of the process of our invention. While the invention will be described in detail by reference to one embodiment of the process employing the apparatus illustrated in the drawing, it should be noted that it is not intended that the invention be limited to the embodiment as illustrated, but is capable of other embodiments which may extend beyond the scope of the apparatus illustrated. Some of the mechanical elements necessary to effect the transfer of liquids and vapors and to maintain the conditions of temperature and pressure necessary to carry out the function of the apparatus, are omitted in order to simplify the description. It will be understood, however, that much equipment of this nature is necessary and will be supplied by those skilled in the art.

Referring to the drawing, a mixture of one or more organic acids and non-acid organic compounds, comprising one or more alcohols, ketones, esters, aldehydes, or hydrocarbons, individually or in combination, is supplied through line 10 and transferred through this line to a mixer 11. Mixer 11 is provided to intimately mix the solution introduced through line 10 with an alkali, or an aqueous solution of an alkali, transferred through line 12 into line 10 with which line 12 connects, in order to convert organic acids present, into their corresponding alkali salts, thus effecting separation between organic acids and other organic compounds present, for subsequent acid recovery in the process hereinafter described. At this point, it should be noted that such conditions in mixer 11 may be maintained as to saponify esters if desired.

The resulting mixture from mixer 11, comprising the aforementioned solution of alkali salts of organic acids and also comprising non-acid organic compounds, is transferred through line 13 to a preheater 14. Preheater 14 is supplied to raise the temperature of the aforementioned mixture to a temperature approximately at which evaporation will take place, but below the point of decomposition of the components of the mixture. From preheater 14 the mixture is transferred through line 15 to an evaporation chamber 16. In chamber 16 this mixture is subjected to evaporation or flashing at a reduced pressure, below atmospheric pressure. At this point, it should be noted that the foregoing operation may be carried out batch-wise or as a continuous operation. In continuous operations, the feed in line 15 may be fed into chamber 16 as a spray, the resulting vapors being taken overhead and the remaining dry salts withdrawn from the bottom through a vacuum seal, such as a lock hopper. When it is desired to carry out the foregoing evaporation step as a continuous process, this may also be effected by the use of an enclosed drum dryer. In the latter method, non-acid organic compounds are evaporated from the hot surface of the drums and the remaining salt cake continuously scraped from the rotating drum and discharged through a vacuum seal.

The separated non-acid organic compounds in chamber 16 are withdrawn overhead as vapors through line 17 for further treatment in the process hereinafter described. The separated dry alkali salts of organic acids are withdrawn as bottoms through line 18. These salts are transferred by gravity through line 18 to a mixer 19. Mixer 19 is provided to intimately mix the alkali salts introduced through line 18, with an inorganic acid which is introduced into line 18 through line 20 with which line 18 connects, in order to effect complete regeneration of the organic acids from their salts. The inorganic acid thus introduced into mixer 19 may be a high-boiling inorganic acid having a boiling point higher than that of water, such as sulfuric acid, or an inorganic acid which forms a maximum boiling azeotrope with water, such as hydrochloric acid.

The resulting aqueous mixture from mixer 19, comprises free organic acids and alkali salts of the introduced inorganic acid. This mixture is withdrawn from mixer 19 through line 21 and transferred to a separator 22. In separator 22 heavier organic acids present will separate from the water solution by reason of their insolubility. These acids, comprising an upper acid-rich phase, are withdrawn overhead from separator 22 through line 23 and may be subjected to further treatment outside the scope of the present process, to obtain separation of individual acids where so desired.

The lower water-rich phase which is formed in separator 22, comprises inorganic salts and lighter water-soluble organic acids, and is withdrawn as bottoms from separator 22 through line 24. This water-rich phase is next transferred through line 24 to a suitable point in a distillation tower 25, which functions as an acid stripper. Tower 25 is heated under conditions effective to distill overhead the aforementioned light organic acids as their water-azeotropes, other than acetic acid, which are withdrawn through line 26 and may be subjected to further treatment, outside the scope of the present process, to obtain separation of individual acids where so desired. Bottoms from tower 25, comprising inorganic salts, excess quantities of the introduced inorganic acid, any quantities of acetic acid that may be present, and water are withdrawn through line 27 for further use or treatment outside the scope of the present process.

It should be noted that it is possible to combine the aforementioned overheads from tower 25 in line 26, comprising water-soluble light organic acids as their water-azeotropes, with the heavier water-insoluble organic acids, comprising the upper acid-rich phase from separator 22 in line 23, with which line 26 connects. The streams, thus combined, may be next subjected to further treatment in order to obtain separation of individual acids where so desired. In addition, separation of the aforementioned water-soluble organic acids, present in the lower water-rich phase formed in separator 22 and withdrawn through line 24 may be effected by extraction processes known to those skilled in the art, rather than by distillation as described above, in order to obtain separation of acetic acid together with the other aforementioned water-soluble organic acids, from inorganic salts, excess quantities of the introduced inorganic acid, and water.

As described above, the separated non-acid organic compounds in chamber 16 are withdrawn overhead as vapors through line 17. These vapors are next transferred through line 17 to a cooler 28. Cooler 28 is provided to condense normally liquid components. From cooler 28, the mixture of condensed non-acid organic compounds is passed through line 29 to a vacuum pump 30. Vacuum pump 30 is provided to maintain the desired reduced pressure in chamber 16 by maintaining a vacuum or partial vacuum therein. From vacuum pump 30, the mixture is transferred through line 31 to a condenser 32. Condenser 32 is provided to complete the condensation of all normally liquid materials. From condenser 32 the mixture of non-acid organic compounds is transferred through line 33 to a separator 34. In separator 34 water-insoluble portions of the aforementioned non-acid organic compounds will separate from water present as an upper phase and are withdrawn through line 35 and may be subjected to further treatment, outside the scope of the present process, for the separation of individual compounds where so desired. The lower water phase formed in separator 34 is withdrawn as bottoms through line 36.

As previously described, heat may be supplied to the interior of chamber 16 by preheating the feed in line 13 by transfer through preheater 14. Another method by which evaporation may be carried out in chamber 16, is by the additional use of steam or an inert gas in the chamber to reduce the partial pressure of the non-acid organic compounds. For this purpose, steam or an inert gas may be introduced through line 37 and transferred through this line to a preheater 38. Preheater 38 is provided to aid in the subsequent evaporation in chamber 16 by raising the temperature of the steam or inert gas in line 37 to a temperature sufficiently high to supply the necessary heat at the temperature at which evaporation will take place, below the point of decomposition of the components of the mixture. From preheater 38, the steam or inert gas is transferred through line 39 to chamber 16 for further use in the process hereinbefore described. In carrying out the subsequent steps as previously indicated, any quantities of the inert gas or steam remaining in separator 34 may be recycled into line 37 through line 40 with which line 37 connects It should be noted that in carrying out the evaporation step by the use of additional gas or vapor to reduce the partial pressure of non-acid organic compounds as indicated above, complete drying of the alkali salts in chamber 16 can be carried out without the necessity of maintaining as high a vacuum on the system, as when preheater 14 is used as a source of heat. Where steam or an inert gas is not supplied as additional heat to the evaporation chamber, an absolute pressure in chamber 16 on the order of approximately 25 mm. of mercury or less is required, whereas in the case where steam or an inert gas is suplied as a means of additional heat, the pressure may be considerably higher.

The following specific examples will serve to illustrate, but are not intended in any way to limit, the present invention.

*Example I*

To 177.1 grams (200 c. c.) of a blend of organic compounds obtained as an extract from the oil product derived in the catalytic hydrogenation of carbon monoxide, and comprising organic acids equivalent to 26 weight per cent octanoic acid and approximately 67.6 weight per cent of non-acid organic compounds in addition to water, there was added 12.8 grams of sodium hydroxide dissolved in 15 c. c. of water. The water and non-acid chemicals were distilled over at a pressure of 1.5 mm. of mercury. A maximum temperature of 382° F., which was slightly below the point of decomposition, was maintained. Of the total 177.1 grams of the blend, approximately 119.6 grams of distillate, comprising non-acid organic compounds was removed. This corresponded with the 67.6 weight per cent of non-acid organic compounds originally present in the feed. Similarly, it was found that approximately 46 grams of organic acids as a residue comprising dry alkali salts were also recovered. This corresponded with the 26 weight per cent of organic acids originally present in the feed. The difference of approximately 11.5 grams of the blend not accounted for, represented material lost in the recovery system.

*Example II*

To a similar blend of organic acids and non-acid organic compounds, as used in Example I, comprising 889 grams (1000 c. c.) of the blend, 64 grams of sodium hydroxide dissolved in 75 c. c. of water were added. This mixture was flashed at 300° F. and 20–25 mm. of mercury by dropping from a separatory funnel into a heated flask. A stream of $CO_2$ was kept passing through the flask to lower the partial pressure of the chemicals. The weight of the recovered distillate, comprising non-acid organic compounds, was found to be approximately 474 grams or 53.4 weight per cent of the original feed. The residue, comprising dry alkali salts, was found to be approximately 355 grams or 39.4 weight per cent of the original feed. The variation in the quantity of non-acid chemicals recovered, was accounted for by reason of the loss of distillate in the recovery system.

As described above, the present invention is directed to an improved process for the separation of organic acids from mixtures thereof with non-acid organic compounds, comprising alcohols, ketones, esters, aldehydes, or hydrocarbons, individually or in combination, present in the reaction product obtained in the catalytic hydrogenation of oxides of carbon at elevated temperatures. However, while the invention has been described as having a particular applicability to the separation of such compounds obtained from the source indicated, it should be noted that the process of the invention is not necessarily restricted to effect the desired separation of these compounds as derived from the aforementioned source. The process of the invention may also be successfully applied to the separation of any mixtures of the aforementioned compounds, in whole or in part, without regard to the source from which these mixtures may have been derived and without regard to the relative proportions of the components comprising such mixtures.

In addition, while we have described a particular embodiment of our invention for purposes of illustration, it should be understood that various modifications and adaptations thereof, which will be obvious to one skilled in the art, may be made within the spirit of the invention as set forth in the appended claims.

Having thus described our invention, what we claim and desire to secure by Letters Patent is:

1. In a method for treating a mixture of organic compounds comprising a saponifiable organic acid and an unsaponifiable non-acid organic compound obtained from an oil condensate product produced in the hydrogenation of an oxide of carbon in which said mixture is treated with an alkali to convert said acid to its corresponding alkali salt, the steps of separating the resulting salt from the mixture thereof with said unsaponifiable non-acid organic compound which comprises subjecting the solution of said salt produced by said treatment to evaporative distillation under sub-atmospheric pressure to evaporate the liquid component of said solution without decomposition of said liquid component and deposit said salt as a solid residue, and separately withdrawing vapors and solid residue from said evaporation step.

2. In a method for treating a mixture of organic compounds comprising a saponifiable organic acid and an unsaponifiable non-acid organic compound obtained from an oil condensate product produced in the hydrogenation of an oxide of carbon in which said mixture is treated with an alkali to convert said acid to its corresponding alkali salt, the steps of separating the resulting salt from the mixture thereof with said unsaponifiable non-acid organic compound which comprises subjecting the solution of said salt produced by said treatment to evaporative distillation under a combined vapor pressure of the solution and unsaponifiable non-acid organic compound of not more than 25 mm. of mercury to evaporate the liquid component of said solution and deposit said salt as a solid residue, and separately withdrawing vapors and solid residue from said evaporation step.

3. The method of claim 2 wherein said unsaponifiable non-acid organic compound is an alcohol.

4. The method of claim 2 wherein said unsaponifiable non-acid organic compound is a ketone.

5. The method of claim 2 wherein said unsaponifiable non-acid organic compound is an aldehyde.

6. The method of claim 2 wherein said unsaponifiable non-acid organic compound is an ester.

7. The method of claim 2 wherein said unsaponifiable non-acid organic compound is a hydrocarbon.

8. In a method for treating a mixture of organic compounds comprising a saponifiable organic acid and at least one unsaponifiable non-acid organic compound selected from the group consisting of alcohols, ketones, aldehydes, esters and hydrocarbons obtained from an oil condensate product produced in the hydrogenation of an oxide of carbon in which said mixture is treated with an alkali to convert said acid to its corresponding alkali salt, the steps of separating the resulting salt from the mixture thereof with said unsaponifiable non-acid organic compound which comprises subjecting the solution of said salt produced by said treatment to evaporative distillation under sub-atmospheric pressure to evaporate the liquid component of said solution without decomposition of said liquid component and deposit said salt as a solid residue, and separately withdrawing vapors and solid residue from said evaporation step.

9. In a method for treating a mixture of organic compounds comprising a saponifiable organic acid and at least one unsaponifiable non-acid organic compound selected from the group consisting of alcohols, ketones, aldehydes, esters and hydrocarbons obtained from an oil condensate product produced in the hydrogenation of an oxide of carbon in which said mixture is treated with an alkali to convert said acid to its corresponding alkali salt, the steps of separating the resulting salt from the mixture thereof with said unsaponifiable non-acid organic compound which comprises subjecting the solution of said salt produced by said treatment to evaporative distillation under a combined vapor pressure of the solution and unsaponifiable non-acid organic compound of not more than 25 mm. of mercury to evaporate the liquid component of said solution and deposit said salt as a solid residue, and separately withdrawing vapors and solid residue from said evaporation step.

10. In a method for treating a mixture of organic compounds comprising a saponifiable organic acid and at least one unsaponifiable non-acid organic compound selected from the group consisting of alcohols, ketones, aldehydes, esters and hydrocarbons obtained from an oil condensate product produced in the hydrogenation of an oxide of carbon in which said mixture is treated with an alkali to convert said acid to its corresponding alkali salt, the steps of separating the resulting salt from the mixture thereof with said unsaponifiable non-acid organic compound which comprises subjecting the solution of said salt produced by said treatment to evaporative distillation under a combined vapor pressure of the solution and unsaponifiable non-acid organic compound of not more than 25 mm. of mercury and at a temperature between about 200° F. and about 400° F. to evaporate the liquid component of said solution and deposit said salt as a solid residue, and separately withdrawing vapors and solid residue from said evaporation step.

WILLIAM P. BURTON.
HENRY G. McGRATH.

REFERENCES CITED

The following references are of record in the file of this patent:

UNITED STATES PATENTS

| Number | Name | Date |
|---|---|---|
| 2,056,984 | Schellmann et al. | Oct. 13, 1936 |
| 2,171,324 | Zetzsche et al. | Aug. 29, 1939 |
| 2,274,750 | Soenksen et al. | May 3, 1942 |

FOREIGN PATENTS

| Number | Country | Date |
|---|---|---|
| 542,616 | Germany | Jan. 27, 1932 |

OTHER REFERENCES

Koch et al., Brennstoff-Chemie 16, 382 to 387 (1935).